June 7, 1955          F. TRINCA          2,710,391

TIRE PRESSURE INDICATING AND ALARM SYSTEM

Filed Nov. 23, 1953          5 Sheets-Sheet 1

INVENTOR:

FREDERICK TRINCA,

BY    *C. C. Hines*,

ATTORNEY.

June 7, 1955　　　F. TRINCA　　　2,710,391
TIRE PRESSURE INDICATING AND ALARM SYSTEM
Filed Nov. 23, 1953　　　　　　　　　　　5 Sheets-Sheet 2
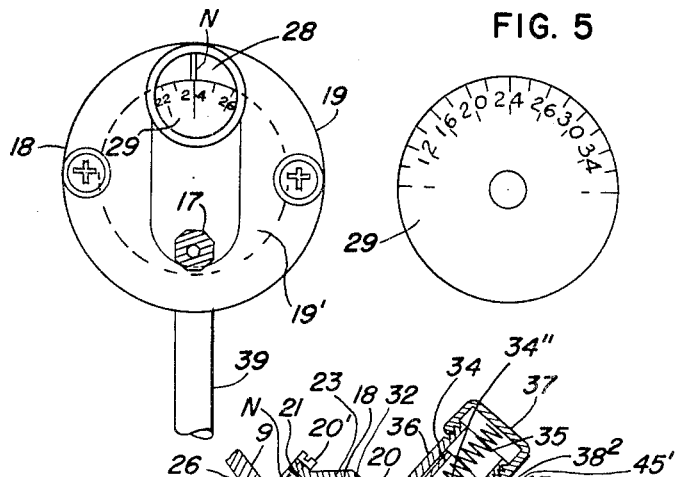
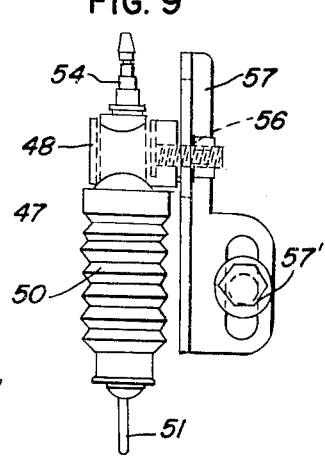
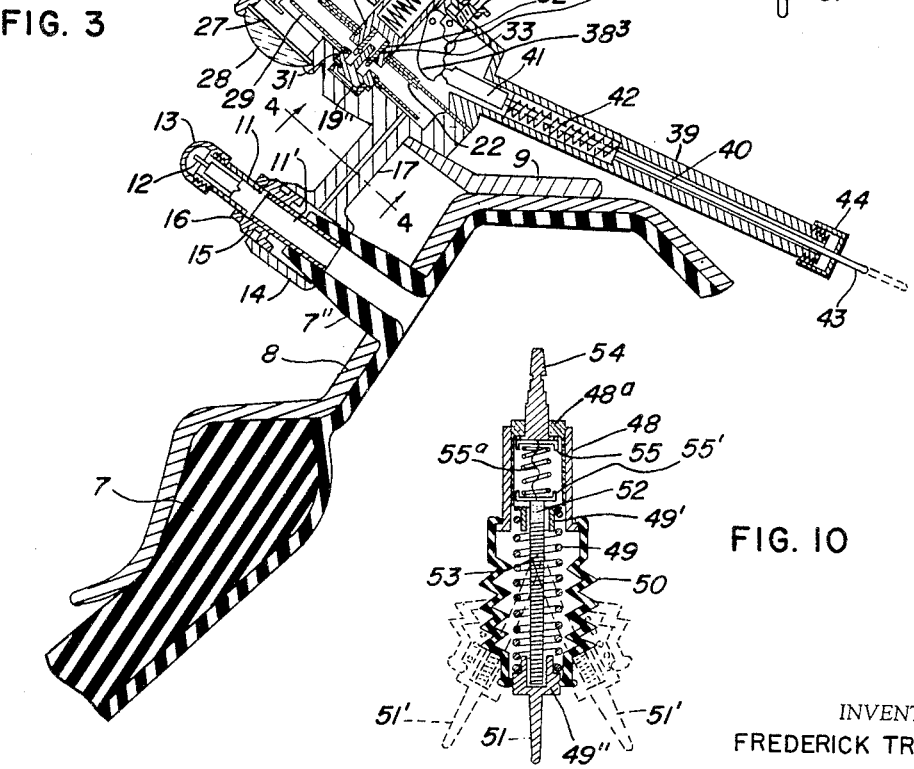
INVENTOR:
FREDERICK TRINCA
BY
ATTORNEY.

June 7, 1955  F. TRINCA  2,710,391
TIRE PRESSURE INDICATING AND ALARM SYSTEM
Filed Nov. 23, 1953  5 Sheets-Sheet 3

INVENTOR:
FREDERICK TRINCA,

BY *C. C. Hines,*

ATTORNEY.

June 7, 1955  F. TRINCA  2,710,391
TIRE PRESSURE INDICATING AND ALARM SYSTEM
Filed Nov. 23, 1953                                    5 Sheets-Sheet 4
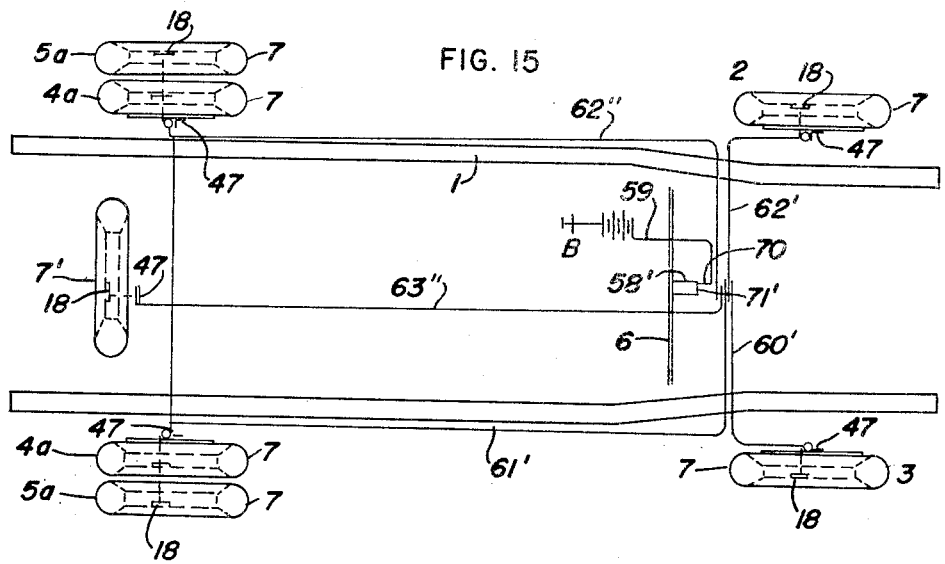
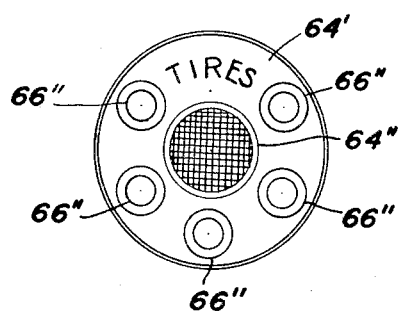
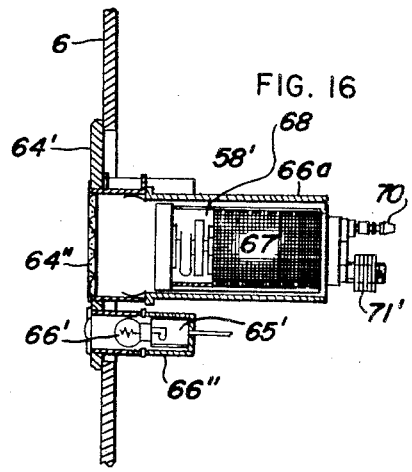
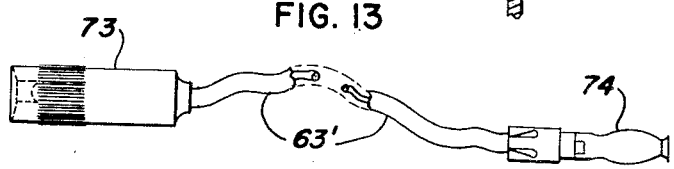
INVENTOR:
FREDERICK TRINCA
BY
ATTORNEY.

INVENTOR:
FREDERICK TRINCA,

BY

ATTORNEY.

United States Patent Office 2,710,391
Patented June 7, 1955

2,710,391

TIRE PRESSURE INDICATING AND ALARM SYSTEM

Frederick Trinca, Middle Village, N. Y.

Application November 23, 1953, Serial No. 393,675

8 Claims. (Cl. 340—58)

This invention relates to pressure indicating means for use on automobiles, trucks, airplanes or other vehicles having wheels equipped with pneumatic tires, for giving an alarm or warning signal, which may be an audible signal, a visual signal, or both, to apprise the driver when the vehicle is in motion of any loss or increase of air pressure below or above a preselected pressure, which occurs in any or all of the tires on the wheels of the vehicle, so that the driver may take measures to correct the fault in time to avoid blow-outs and possible accidents as well as injury to the tires. The invention is also designed to give a warning signal in the event of the loss of pressure in any spare tire or tires, which feature may be used for the convenience of the driver, or not, at his option, but may be employed without interference with the signals given to indicate overinflation or underinflation of the tires in active use on the vehicle wheels.

The primary object of the invention is to provide signalling or warning means of the character described which is simple of construction, reliable and efficient in action, economical in installation and maintenance, and adapted to be readily applied to any vehicle without alteration in any manner of any of the parts of the vehicle.

A further object of the invention is to provide means of this character which will operate without appreciable wear on or injury to the tires or any other parts of the vehicle, which embodies switch actuating and switch elements located on the wheels and a fixed part of the vehicle so as to be largely protected against casual injury, which is controlled by the tire pressure and operates in such a manner as to avoid the giving of false signals, and which will operate in either the forward or backward travel of the vehicle.

A still further object of the invention is to provide a signal means applicable to single wheel or dual wheel installations, and which will indicate at the dash and directly to the driver the particular tire or tires which at any time have become faulty with respect to air pressure and require attention.

A still further object of the invention is to provide individual indicators for the tires which will show the amount of pressure existing in a tire at any time and by which the tire pressure may be quickly read when the vehicle is at rest to avoid delays in tire checking.

With these and other objects in view, which will appear in the course of the subjoined description, the invention consists of the novel features of construction, combination and arrangement of parts hereinafter more fully set forth and claimed, and as shown in the accompanying drawings, in which:

Fig. 3 is a view similar to Fig. 2, but showing the pressure gage and switch actuator in axial vertical section.

Fig. 4 is a face view of the pressure gage showing its stem in section taken on line 4—4 of Fig. 3.

Fig. 5 is a face view of the pressure indicating dial of the pressure gage.

Figure 6:
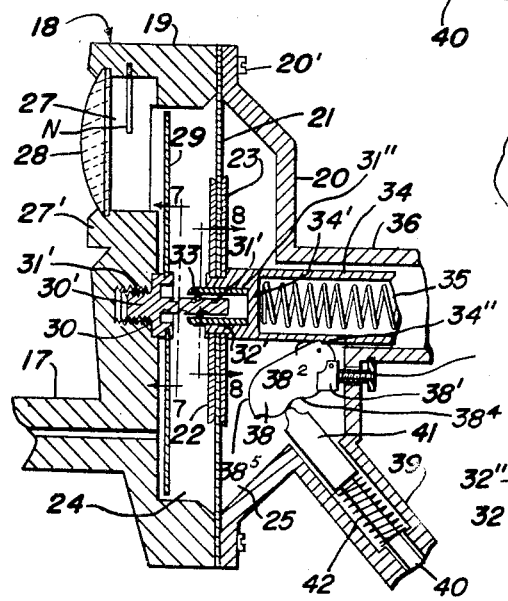
Fig. 6 is an enlarged detail sectional view through the pressure gage and switch actuator showing features of construction thereof.
Figure 7:
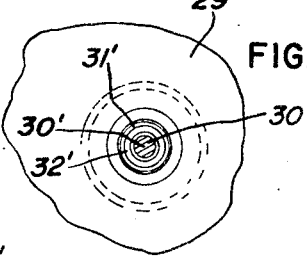
Figure 8:
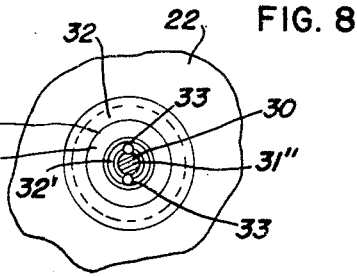

Figs. 7 and 8 are sections on the lines 7—7 and 8—8 of Fig. 6.

Fig. 9 is a view in side elevation of the signal circuit closing switch.

Fig. 10 is a sectional view of the same.

Figure 11:
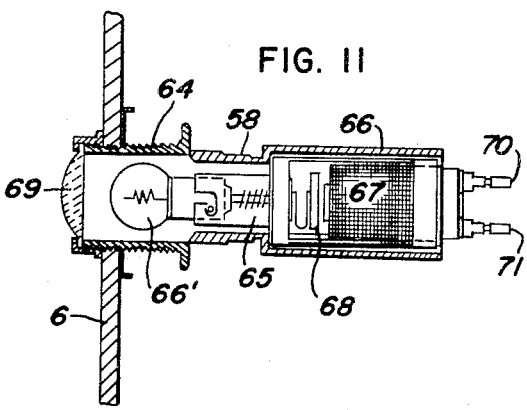

Fig. 11 is a section through the instrument board of the vehicle and the automatic signal device or indicator mounted thereon.

Figure 12:
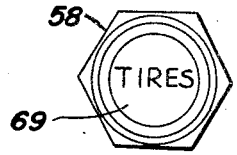

Fig. 12 is a front end view of the signal device shown in Fig. 11.

Fig. 13 is a view of the spare tire connection cord.

Figure 14:
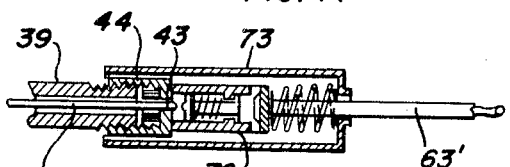

Fig. 14 is a sectional view showing the coupling end of the cord connected with the switch actuator of the gage on the spare tire.

Figure 1:
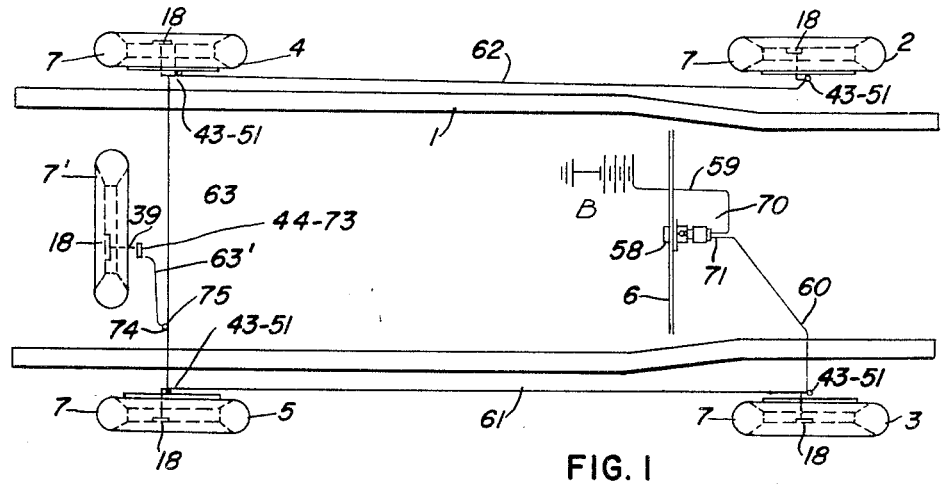
Fig. 1 is a diagrammatic plan view of the frame, wheels and instrument board of a pneumatic-tired vehicle showing the application of the invention thereto.
Figure 2:
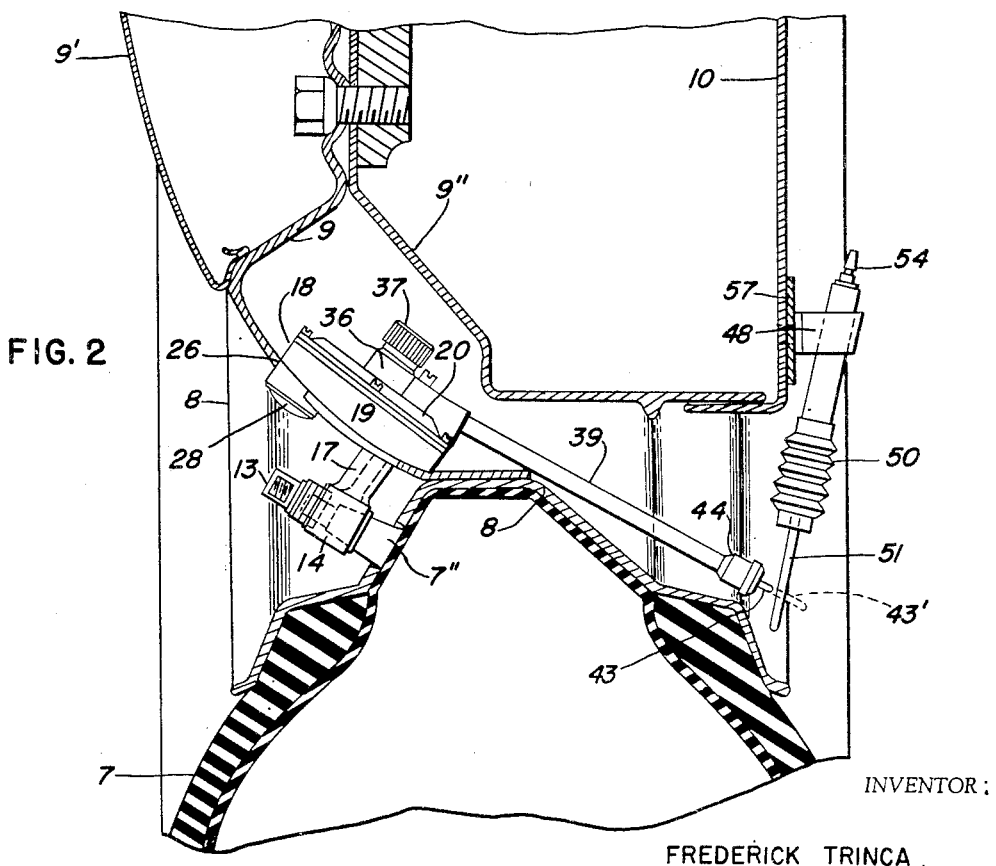
Fig. 2 is a vertical transverse section on an enlarged scale through a portion of one of the wheels, the brake drum and a pneumatic tire mounted on the wheel showing in elevation the pressure gage or indicator and its associated switch actuator mounted on the wheel and the coacting circuit closing switch mounted on the back plate of the drum.

Fig. 15 is a view similar to Fig. 1 showing the embodiment of the invention as employed in connection with vehicles having dual wheels.

Fig. 16 is a section similar to Fig. 11 showing the multiple signal or indicating device used in the organization disclosed in Fig. 15.

Fig. 17 is a front end view of the multiple signal device shown in Fig. 16.

Figure 18:
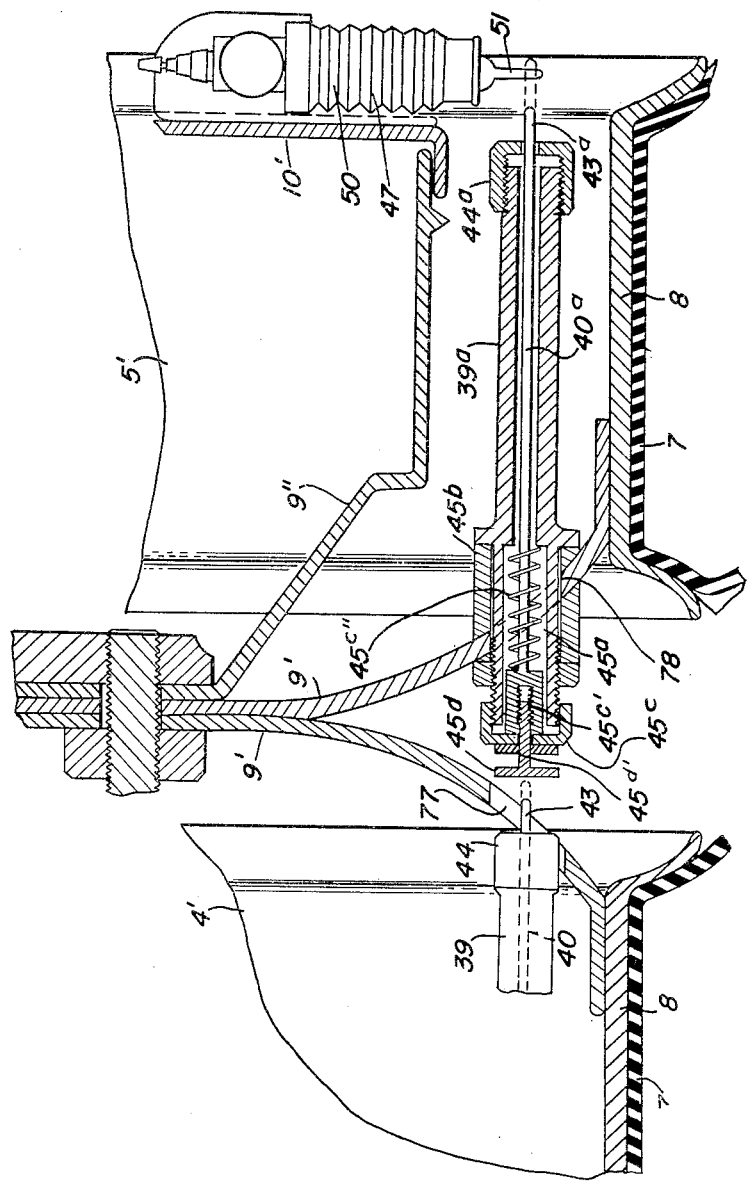

Fig. 18 is a sectional view through positions of dual wheels and through one end of a switch actuator on the outer wheel of the dual wheel assembly and a coupling extension for operatively connecting the same with the switch actuator of the inner wheel of the dual wheel assembly.

Referring now more particularly to Figures 1 to 13, inclusive, of the drawings, 1 designates the frame, 2—3 the front wheels, 4—5 the rear wheels, and 6 the instrument board or panel of an automobile of conventional type, on each of which wheels a pneumatic tire 7 of conventional type is mounted. As shown, the tire 7 is mounted on a conventional channeled rim 8, and each wheel is provided with the usual dished body plate 9, hub cap 9', and drum 9'' which is fixed to the wheel body and closed at its inner side by the usual cover or back plate 10 mounted on the wheel axle housing. Figure 1 also shows a spare tire 7' which may be mounted on a suitable carrier at the rear or any other suitable point on the vehicle.

Each tire 7, 7' is provided with an inflating and deflating valve tube or stem 11 in which is enclosed the usual valve means, the valve pin 12 only of which is shown together with its closure cap 13', said tube or stem being fitted in a nipple 7'' projecting from the tire through the outer side of the rim and into and through a coupling sleeve 14, bushing 15 and threaded fastening collar or nut 16, associated therewith, which sleeve is connected by a tubular air conducting stem 17 with a pressure controlled gage and switch actuating device 18 carried by the wheel body 9. The tube 11 is formed with an opening 11' connecting the nipple, sleeve and the bore of the stem with the air space of the tire.

The gage and switch actuating device 18 comprises a casing or housing of preferably circular form and consisting of a front body member 19 and a rear cap or cover member 20 secured thereto, as by screws or like fastenings 20'. Arranged between and clamped at its periphery to and between said members 19 and 20 is a flexible diaphragm 21 reinforced to a certain degree by front and rear metallic plates 22, 23, which diaphragm divides the casing into front and rear pressure and actuating chambers 24 and 25. The bore of the stem 17 opens through the front wall of the body member 19 into the chamber 24, which is always in communication through the connections described with the air space of the tire.

The front wall portion 27' of the gage housing body member 19, which forms the front wall of the chamber 24 and face plate of the housing, fits within an opening 26 in the outer side of the wheel body member 9 and has arranged therein a window or sight opening 27 closed by a transparent bull's eye or closure panel 28. Disposed in the chamber 24 between the front wall of the body 19 and the flexible diaphragm 21 is a rotary or oscillatory dial plate 29 bearing on its face scale marks consisting, for example, of a normal pressure numeral as 24, and numerals at opposite sides thereof designating relatively lower and higher tire pressures, as shown in Fig. 5.

The dial plate 29 is carried by a rotary or oscillatory helicoidally or spirally grooved or bladed impeller shaft 30 formed independently of and fixed to or formed initially at its outer end with a hub member 31 to which the dial plate is secured, which hub member has a bearing extension 31' journalled in a bearing recess 19a formed in a housing member 19. As shown at 31a the bearing extension 31' and annular wall of the recess 19a are provided with screw threads connecting the shaft and hub with the wall for a limited degree of longitudinal travel of the shaft and frictional resistance to rotation of the dial under motions imparted to the shaft by the actions of the diaphragm. The grooved body 31'' of the shaft 30 projects into the bore of a traveler sleeve 32' fitted in a socket at 32'' at the forward end of a guide sleeve 32 and having arranged therein projections in the form of antifriction balls 33 or the like engaging the grooves of the shaft whereby, when the diaphragm is moved in one direction or the other, motion will be transmitted to the shaft and to the dial 29 to rotate the same in one direction or the other. The guide sleeve 32 is fixed at its forward end to the diaphragm to move therewith and has a portion 34 separated from the socket 32' by an abutment head 34' and disposed in a tubular guide stem 36 extending from the housing section 20. A coiled spring 35 is arranged in the sleeve 32 between the abutment head 34' and a screw cap 37 closing the outer end of the stem 36. This spring acts on the diaphragm in opposition to the air pressure to balance the same under a preselected pressure, and its action may be regulated by adjustment of the cap 37 to regulate the movements of the diaphragm to maintain the tire pressure at the preselected pressure point. The construction described provides a spiral-driver type of motion transmitting means for rotating the dial in either direction from a normal position to indicate pressure decreases or increases in which the straight line motion of the diaphragm and shaft are translated into rotary movements of the dial which movements of said parts are permitted by the threaded connection between the hub 31 and wall of the recess 19a which opposes a frictional resistance to the rotation of the shaft, its hub and the dial just sufficient to hold the dial against rotation in normal indicating position and prevent overthrow of the dial when operated.

As stated, by adjustment of the cap 37 the pressure of the spring 35 may be varied as desired and according to the preselected air pressure to maintain the dial against flexion in one direction in its normal indicating position.

Thus, assuming that the preselected normal pressure is 24 pounds per square inch, this numeral on the dial will register with a fixed indicator N in the gage housing and show through the window 28 so as to be readily and quickly viewed by the motorist standing alongside the wheel who will thus be advised that the tire is inflated to the prescribed degree.

If, on the other hand, the tire pressure has changed, so as to be lesser or greater than the selected pressure, this fact will be indicated by movement of the dial in one direction or the other and show through the window. The motorist may thus check all tires without loss of time and take measures to correct any inflation faults before starting the machine in motion.

The construction of the pressure gage, as thus far described, adapts it to be employed as a simple and efficient permanent indicator to enable a motorist at any time to check a tire with respect to air pressure in an easy and quick manner, but I provide in addition to the use of such a gage in connection with each tire, means for automatically giving the motorist a warning notice, while the machine is running, of the fact that a tire is underinflated or overinflated, when such a condition occurs, so that he may stop the machine to remedy the fault and avoid a possible accident or damage to the tire.

Carried by the gage housing is a switch actuator and actuating means therefor which comprises the tube or sleeve part 34 having an actuating shoulder 34'', a cam 38 pivotally mounted on a bracket 38' in the housing chamber 25, and having abutment surfaces $38^2$, $38^3$, $38^4$, a sleeve or tube 39 projecting inwardly over the vertex of the rim 8 toward the inner side of the wheel between the rim and brake drum, and an actuating plunger rod 40 slidably mounted in the sleeve 39. This rod 40 has at its inner end a contact head 41 normally urged inwardly by a spring 42 against the face $38^4$ of the cam to maintain the cam in normal position, the outer or opposite end 43 of the rod normally extending a short distance beyond the outer end of the sleeve 39 through an opening in a guide and closure cap 44 applied to such end of the sleeve. The cam is mounted on the bracket 38' in the housing member 20 to swing from and toward the tube 32 and is limited in its swinging movement toward the head 41 by an adjustable stop sleeve 45. The face $38^2$ of the cam is engaged by the shoulder 34'' on the tube 34 against which it is held by the pressure of the spring 35, to swing the cam toward the contact head 41 to force the plunger rod 40 outwardly in the sleeve 39.

When the tire pressure is normal, or at the preselected pressure, the parts of the gage are arranged as shown in Figure 3, in which the diaphragm is in neutral position under the balanced pressures of the spring 35 and the air in the tire. If the tire pressure should fall below the preselected pressure, spring 35 will force the diaphragm forward against the lowered tire pressure and the shoulder 34'' will engage the cam surface 38'' and force the rod 40 outwardly in tube 39. On the other hand, if the tire pressure should rise above the selected normal pressure the diaphragm plate 23 will engage the cam surface $38^3$ and cause rod 40 to be projected outwardly in tube 39. Hence in either movement of the diaphragm from normal position rod 40 will be forced outwardly against the resistance of spring 42. In these operations the dial 29 will be turned in one direction or the other to indicate the changed tire pressure and enable the same to be read through the sight panel.

The rod 40 of actuator 39 is provided for cooperation with a circuit closing switch 42 which is preferably mounted on the back plate 10, but may be mounted on some other suitable fixed part of the vehicle. This switch comprises a head tube 48, an insulated closure plug $48^a$ at the top of the tube, relatively stationary and movable upper and lower conductors 55, 55' in said tube, a plug-in connector or terminal, 54, at the top of the tube, a spring and conducting wire connection $55^a$ coupling the conductors to electrically connect them and permit movement of the movable lower conductor 55', a contact ring 49' at the bottom of the tube 48, a contact socket 49'' arranged below the tube and carrying a contact pin or piece 51, a conducting spring 49 extending between the ring 49' and socket 49'', a coiled spring supporting and conducting stem 53 seated at its lower end in the socket 49'' and projecting at its upper end through the ring 49' and connected to the lower movable contact 55', and a corrugated jacket 50 of rubber or other elastic material connected to the parts 48, 49" and housing and projecting the intervening parts. The upper end of the flexible or resilient stem 53 is provided with an insulated portion 52 where it projects through the ring but is electrically connected to the lower contact 55, so that the circuit is broken through conductors 49' and lower contact 55 when the tire pressure is at the proper point and the parts are arranged in the normal circuit breaking position shown in full lines in Fig. 10. Part 48 is connected by suitable fastening means 56 with an angle bracket 57 having a portion slotted for passage of a fastening screw or bolt 57' to detachably and adjustably secure the switch to the plate 10. It will be observed that the gage 18 is located at the outer side of the wheel within the plane of its disk body 9 and hub cap 9' and the outer side of the wheel rim, that the actuator 39 extends transversely at an angle from the gage between the wheel body and rim toward the inner side of the rim with the contact end 43 of its rod 40 terminating close to but one side of the contact pin 51 of the switch, which lies substantially within the plane of the inner side of the wheel body and rim and substantially at a radial angle to the wheel axis. By this arrangement the pressure gage, switch actuator and switch are so located as to be largely protected against damage by casual contact with extraneous objects. Also with this arrangement it will be noted that the actuating rod in its switch closing movement will be projected inwardly on a line transversely of the wheel to bring the contact end 43 of its rod 40 into position to wipingly engage the switch contact pin 51 to make and break the signal circuit once on each revolution of the wheel. In this action, the pin 51, due to its elastic mounting yields under pressure of the rod 43 to one or the other of its dotted line positions 51' shown in Fig. 10, to allow the rod 43 to wipe across it, after which by the reaction of its elastic mounting, the pin 51 is returned to its normal position. This circuit make and break action will occur in either direction of rotation of the wheel, so that the circuit will be energized to give a warning signal whether the vehicle is running forward or backwardly, as will be readily understood.

The switches 47 are arranged in an electric signal circuit including the car ignition battery B, or other source of current supply, a signal device 58 mounted on the vehicle dash or instrument board 6 and conductors 59, 60, 61, 62 and 63 connecting the signal device and switches 47 in circuit with the battery for energizing the signal device each time a switch 47 is closed. The signal device shown comprises a housing secured to the instrument board and having a chamber 64 containing a socket 65 for a signal lamp 66' and its circuit connections and a chamber 66 containing an electromagnetic coil 67 and a vibrator 68 actuated thereby.

The vibrator here is in the form of an armature adapted like a door bell armature to be rapidly vibrated by its coil to make and break the circuit a predetermined number of times during the period a circuit closing switch is closed. The armature here performs a double function. It makes and breaks the lamp circuit to cause the lamp to flash and give a visual signal and it serves in its vibratory action as a buzzer to give an audible signal. The chamber 64 is closed at its front by a transparent panel or bull's eye 69 on which the informatory word "Tires" may appear and the coil 67 is provided with terminals 70 and 71 for connection of conductors 59 and 60 therewith. Thus when a switch 47 closes the circuit the signal device will give a light flash and a buzz to indicate that a tire is overinflated or underinflated, so that the motorist will be warned to enable him to act promptly to cure the defect.

In addition to the conductors above mentioned there is provided a conducting connection 63' between the conductor 63 and switch 47 of the spare tire 7', which conductor 63', as shown in Fig. 13, is provided at one end with a coupling sleeve 73 and spring-pressed contact 76 for application to the tube 39 and contact with the rod 43 of its actuator and is provided at its opposite end with a plug-in contact 74 for engagement with a socket 75 in conductor 63.

Figures 14 to 17 inclusive, show an arrangement for the motor vehicles having multiple wheel sets, such as dual wheels at the rear thereof, and in which provision is made for indicating at the dash the wheel, or location of the wheel, the tire of which at any time becomes defective because of overinflation or underinflation.

In the arrangement here shown, there is disclosed the use of single wheels 2—3 at the front of the vehicle and sets of dual wheels 4—4a, 5—5a at the rear of the vehicle and the use of a multiple signal device 58' on the vehicle dash. As shown, the circuit arrangements are the same as those described with reference to Figures 1–14 except that the switches 47 associated with the tires of wheels 2, 3, 4a, 5a and tire 7' are connected by conductors 62', 60', 62", 61', and 63" with the terminal 71' of the signal device 58', the other terminal 70 of which is connected by conductor 59 to the battery. The housing of this signal device 58' differs from the housing of signal device 58 in that it has a single chamber 66a to contain the coil 67 and is provided with a bracket or face plate 64' which is fastened to the instrument board 6 and is formed with a front sound emitting opening covered by a screen 64". This signal device 58' is also provided with a buzz-producing vibrator 68, but omits the lamp 66'. In place of the lamp 66' a plurality of flash signal devices 66" are provided comprising casings arranged in a group on the plate 64' about the screen 64" and each containing a lamp socket 65' and a flash lamp 66' and provided at the front with a bull's eye or transparent light emitting panel 69". The terminal 71' here is a multiple terminal connected with the coil 67 and one terminal of each lamp, the other terminals of the lamps being respectively connected with the individual conductors 60, 61', 62', 62" and 63" so that the circuit closing operation of any switch 47 will cause the buzzer to sound and the proper lamp to glow. But five signal devices 66" are shown, although seven tires are arranged to be guarded, to which end a special connection is provided for operatively connecting the switches to each dual tire set to give a signal when either tire of the set becomes defective because of over or under inflation, thus simplifying the system and reducing the number of conducting connections required. This special connection 76 is specifically shown in Fig. 18 and is employed as shown in Figs. 14 and 18 to bridge across tires of a set such as 4—4a or 5—5a, between a switch and a switch actuator so that over pressure or under pressure of either tire of the set will cause one switch 47 of the pair to be operated to close the circuit to give an alarm showing that at least one tire of the set is defective.

As shown, the disk portions 9" of the outer and inner wheels of a dual wheel assembly 4', 5', which, with the brake drum 9" of wheel 5' is illustrated, together with its back plate 10', the disks 9" are formed with openings 77, 78 and a single switch 47 is mounted on the back plate of the inner while a switch actuator 39 extending from the pressure indicator mounted on wheel 4' is arranged so that the end 43 of its actuating rod or stem 40 projects toward the wheel 5' through the opening 77. For cooperation with this actuator 29 there is provided an extension device or actuator 78 mounted on wheel 5' to operate the switch 47 whenever rod 40 is operated due to underinflation or overinflation of the tire mounted on wheel 4'. This actuator extension comprises a tube or housing 39a having a chambered or socketed portion 45a at its outer end projecting through the opening 78 and secured by suitable coupling means 49c to the disk 9" of wheel 58, and having at its inner end a cap 44a similar to cap 44 of the actuator 39. The outer end of the housing 39a is threaded to receive a nut forming a part of the coupling means and a cap 45c forming an adjustable closure member and a stop for a socketed follower 45c′ pressed against the cap 45c and by a spring 45c″. This follower is fixed to the outer end of one actuator rod 40a extending through the housing 39a and its caps 45c and 44a and is threaded to receive a threaded stem 45d′ projecting thereinto through an opening in the cap 45c, which stem is carried by a contact piece 45d disposed so as to be engaged by the end 43 of the actuator rod 40 when the latter is actuated by its pressure gage. Contact 45d is adjustable with relation to end 43 of rod 40, for an obvious purpose, and when engaged and operated by rod 40 is moved inward against the resistance of spring 45c′ to transmit motion to rod 40a to bring its inner end 43a into position to engage the contact 51 of the switch 47.

Thus this arrangement provides for a signal indication of a pressure defect in any of the tires of wheels 2 and 3 and the spare tire, and an indication with respect to each of these tires, but not with respect to the individual tires of the dual wheels. This is not necessary, however, as when a signal indication with respect to a dual wheel set is given, the motorist, on inspecting the pressure gages of the tires of the indicated set, can at once see what tire is affected. The provision of means for indicating the pressure existing in a tire of a set of dual wheel tires is of value and importance, as often one tire of a set becomes deflated to such an extent that this tire does not carry its part of the load, with the result that the other tire becomes overloaded without this fact being known or readily observable, which condition may cause a blow-out of the overloaded tire and damages to the tires and the truck. The present invention provides a means for reducing this liability of damage to the minimum.

From the foregoing description, taken in connection with drawings, the construction, mode of operation and advantages of my invention will be understood without a further and extended description, and it will be understood that while the structural organizations shown are preferred, these, as well as their parts, may be varied as desired within the scope of the appended claims, without departing from the spirit of the invention or sacrificing any of the advantages thereof.

Having thus described my invention, I claim:

1. An alarm gage for indicating air pressure changes in pneumatic tires from a given normal pressure comprising a gage body having an air chamber therein, said chamber comprising a wall movable in response to pressure changes in the chamber, means for communicating said chamber with the interior of a pneumatic tire, an alarm actuator carried by said gage body, means for moving said actuator in a given direction when said wall moves in one direction from a neutral position, and means for moving the actuator in the same given direction when the wall moves in the opposite direction from its neutral position.

2. An alarm gage for indicating air pressure changes in pneumatic tires from a given normal pressure comprising a gage body having an air chamber therein, said chamber comprising a wall movable in response to pressure changes in the chamber, means for communicating said chamber with the interior of a pneumatic tire, an alarm actuator carried by said gage body, means for moving said actuator in a given direction when said wall moves in one direction from a neutral position, means for moving the actuator in the same given direction when the wall moves in the opposite direction from its neutral position, and resiliently yieldable means for holding the movable wall in a neutral position against air pressure in the chamber.

3. An alarm gage for indicating air pressure changes in pneumatic tires from a given normal pressure comprising a gage body having an air chamber therein, said chamber comprising a wall movable in response to pressure changes in the chamber, means for communicating said chamber with the interior of a pneumatic tire, a rotatable member carried by the gage body, means for rotating said member in a given direction when said wall moves in one direction from a neutral position, means for rotating the member in the same given direction when the wall moves in the opposite direction from its neutral position, an alarm device, and an alarm actuator for said device connected to said member and movable therewith.

4. An alarm gage for indicating air pressure changes in pneumatic tires from a given normal pressure comprising a gage body having an air chamber therein, said chamber comprising a wall movable in response to pressure changes in the chamber, means for communicating said chamber with the interior of a pneumatic tire, a lever pivoted to the gage body, means carried by the movable wall for contacting the lever and turning it in a given direction when the wall moves in either direction from a neutral position, an alarm device, and an actuator for the alarm device movable by said lever.

5. An alarm gage for indicating air pressure changes in pneumatic tires from a given normal pressure comprising a gage body having an air chamber therein, said chamber comprising a wall movable in response to pressure changes in the chamber, means for communicating said chamber with the interior of a pneumatic tire, a lever pivoted to the gage body, means carried by the movable wall for contacting the lever and turning it in a given direction when the wall moves in either direction from a neutral position, an alarm device, an actuator for the alarm device, and resiliently yieldable means for holding the movable wall in a neutral position against air pressure in the chamber.

6. An alarm gage for indicating air pressure changes in pneumatic tires comprising a gage body, means for mounting the gage body on a tire carrying wheel independently of the tire, said gage body having an air chamber and means for communicating the chamber with the interior of the tire, said chamber having a wall movable in response to pressure changes in the chamber, a protractable plunger carried by the gage body and having its outer end eccentrically disposed so as to revolve in an orbit about the axis of the wheel, means protracting the plunger when the said chamber wall moves in either direction from a given neutral position, a switch having a contact arm projecting therethrough, and means for mounting the switch member with the contact arm in a relatively stationary position in the orbit of revolution of the plunger in its protracted position.

7. An alarm gage as defined by claim 6 in which the contact arm is flexibly mounted on the switch member.

8. An alarm gage as defined by claim 6 in which the switch member comprises a flexible housing, said contact arm being attached to and projecting from one end of the housing, and a bracket at the other end of the housing for mounting the switch bracket.

References Cited in the file of this patent

UNITED STATES PATENTS

| | | |
|---|---|---|
| 1,117,329 | Cleveland | Nov. 17, 1914 |
| 1,144,834 | Freeman | June 29, 1915 |
| 1,398,992 | Zimmerman | Dec. 6, 1921 |
| 2,057,387 | Loeb | Oct. 13, 1936 |
| 2,334,443 | Schubert | Nov. 16, 1943 |
| 2,499,669 | Murat | Mar. 7, 1950 |